US010525380B2

(12) United States Patent
Miller et al.

(10) Patent No.: US 10,525,380 B2
(45) Date of Patent: Jan. 7, 2020

(54) FLOATING CHOPPER SLUDGE WEIR

(71) Applicant: Air and Liquid Systems, Inc., Rochester Hills, MI (US)

(72) Inventors: James E. Miller, Troy, MI (US); Gordon T. Urquhart, Birmingham, MI (US)

(73) Assignee: AIR AND LIQUID SYSTEMS, INC., Rochester Hills, MI (US)

( * ) Notice: Subject to any disclaimer, the term of this patent is extended or adjusted under 35 U.S.C. 154(b) by 258 days.

(21) Appl. No.: 15/404,358

(22) Filed: Jan. 12, 2017

(65) Prior Publication Data

US 2018/0193774 A1    Jul. 12, 2018

Related U.S. Application Data

(60) Provisional application No. 62/300,312, filed on Feb. 26, 2016, provisional application No. 62/277,682, filed on Jan. 12, 2016.

(51) Int. Cl.
*B01D 21/24* (2006.01)
*B03D 1/24* (2006.01)
(Continued)

(52) U.S. Cl.
CPC ..... *B01D 21/2438* (2013.01); *B01D 17/0214* (2013.01); *B01D 17/0217* (2013.01); *B01D 21/0012* (2013.01); *B01D 21/0084* (2013.01); *B01D 21/2433* (2013.01); *B01D 21/2488* (2013.01); *B01D 21/267* (2013.01); *B03D 1/1462* (2013.01); *B03D 1/247* (2013.01); *B05B 14/462* (2018.02); *C02F 1/24* (2013.01); *C02F 1/40* (2013.01); *B05B 14/465* (2018.02);
(Continued)

(58) Field of Classification Search
CPC ........... B01D 21/2438; B01D 21/2488; B01D 21/2433; B01D 21/0084; B01D 21/267; B01D 17/0214; B01D 17/0217; B03D 1/247; B03D 1/1462; B05B 15/00; B05B 14/462; C02F 1/24; C02F 1/40; C02F 11/12; C02F 2103/14; C02F 2101/32
See application file for complete search history.

(56) References Cited

U.S. PATENT DOCUMENTS 3,219,188 A    11/1965 Hirs
4,092,242 A    5/1978 Deane
(Continued)

OTHER PUBLICATIONS

Skimoil, Inc.; St. Louis, MO; "The loating Weir Surface/Oil Skimmer"; www.skimoil.com/floating_weir.htm; p. 1-4.

*Primary Examiner* — Liam Royce
(74) *Attorney, Agent, or Firm* — Warn Partners, P.C.

(57) ABSTRACT

A system for consolidating and removing contaminate such as paint sludge or oils from a fluid mixture. A contaminate tank receives a supply of the fluid mixture containing contaminate from a source such as a manufacturing line where overspray of paints or cleaning solutions containing washed away oils are collected. A free floating weir floats on the surface of the contaminate tank and mechanically separates and removes contaminate from a surface of the contaminate tank and concentrates contaminate in a consolidation tank. The free floating weir is equipped with several features that enhance the ability of the free floating weir to remove contaminate without becoming clogged.

18 Claims, 13 Drawing Sheets

(51) Int. Cl.
  *B03D 1/14* (2006.01)
  *B05B 14/462* (2018.01)
  *C02F 1/24* (2006.01)
  *C02F 1/40* (2006.01)
  *B01D 17/02* (2006.01)
  *B01D 21/00* (2006.01)
  *B01D 21/26* (2006.01)
  *B05B 14/465* (2018.01)
  *C02F 11/12* (2019.01)
  *C02F 103/14* (2006.01)
  *C02F 101/32* (2006.01)

(52) U.S. Cl.
  CPC ........... *C02F 11/12* (2013.01); *C02F 2101/32* (2013.01); *C02F 2103/14* (2013.01)

(56) References Cited

U.S. PATENT DOCUMENTS

| | | |
|---|---|---|
| 4,132,645 A | 1/1979 | Bottomley et al. |
| 4,193,869 A | 3/1980 | Brucker et al. |
| 4,405,458 A * | 9/1983 | McHugh, Jr. ...... B01D 17/0214 210/242.1 |
| 4,585,557 A | 4/1986 | Turnquist |
| 4,713,181 A | 12/1987 | Russell |
| 4,746,424 A | 5/1988 | Drew |
| 5,059,312 A | 10/1991 | Galletti |
| 5,078,863 A | 1/1992 | Durigon |
| 5,158,679 A * | 10/1992 | Brock ................. B01D 17/0214 210/241 |
| 5,370,792 A | 12/1994 | Bhatnagar et al. |
| 5,372,711 A | 12/1994 | Sill |
| 5,378,376 A | 1/1995 | Zenner |
| 5,591,011 A | 1/1997 | Ray et al. |
| 5,665,248 A * | 9/1997 | McKiddy, II ......... E04H 4/1218 15/421 |
| 5,702,240 A | 12/1997 | O'Neal et al. |
| 5,738,782 A | 4/1998 | Schafer et al. |
| 5,840,187 A | 11/1998 | Derenthal et al. |
| 5,895,566 A * | 4/1999 | Tittlebaum ............ C02F 3/1242 210/195.4 |
| 6,036,434 A | 3/2000 | Ray et al. |
| 6,074,554 A | 6/2000 | Ray et al. |
| 6,277,273 B1 | 8/2001 | Gore et al. |
| 6,322,694 B1 | 11/2001 | Iliadis et al. |
| 6,761,820 B2 | 7/2004 | Miller |
| 6,797,161 B2 | 9/2004 | Use et al. |
| 6,962,656 B2 | 11/2005 | Davidian et al. |
| 7,368,054 B2 | 5/2008 | Porter et al. |
| 7,767,085 B2 | 8/2010 | Urquhart et al. |
| 8,277,652 B2 | 10/2012 | Urquhart et al. |
| 2008/0190834 A1 | 8/2008 | Urquhart et al. |
| 2010/0213110 A1 | 8/2010 | Urquhart et al. |
| 2010/0236999 A1* | 9/2010 | Utsunomiya .......... B01D 21/04 210/199 |
| 2016/0051907 A1* | 2/2016 | McCutchen ....... B01D 21/2444 210/122 |

\* cited by examiner

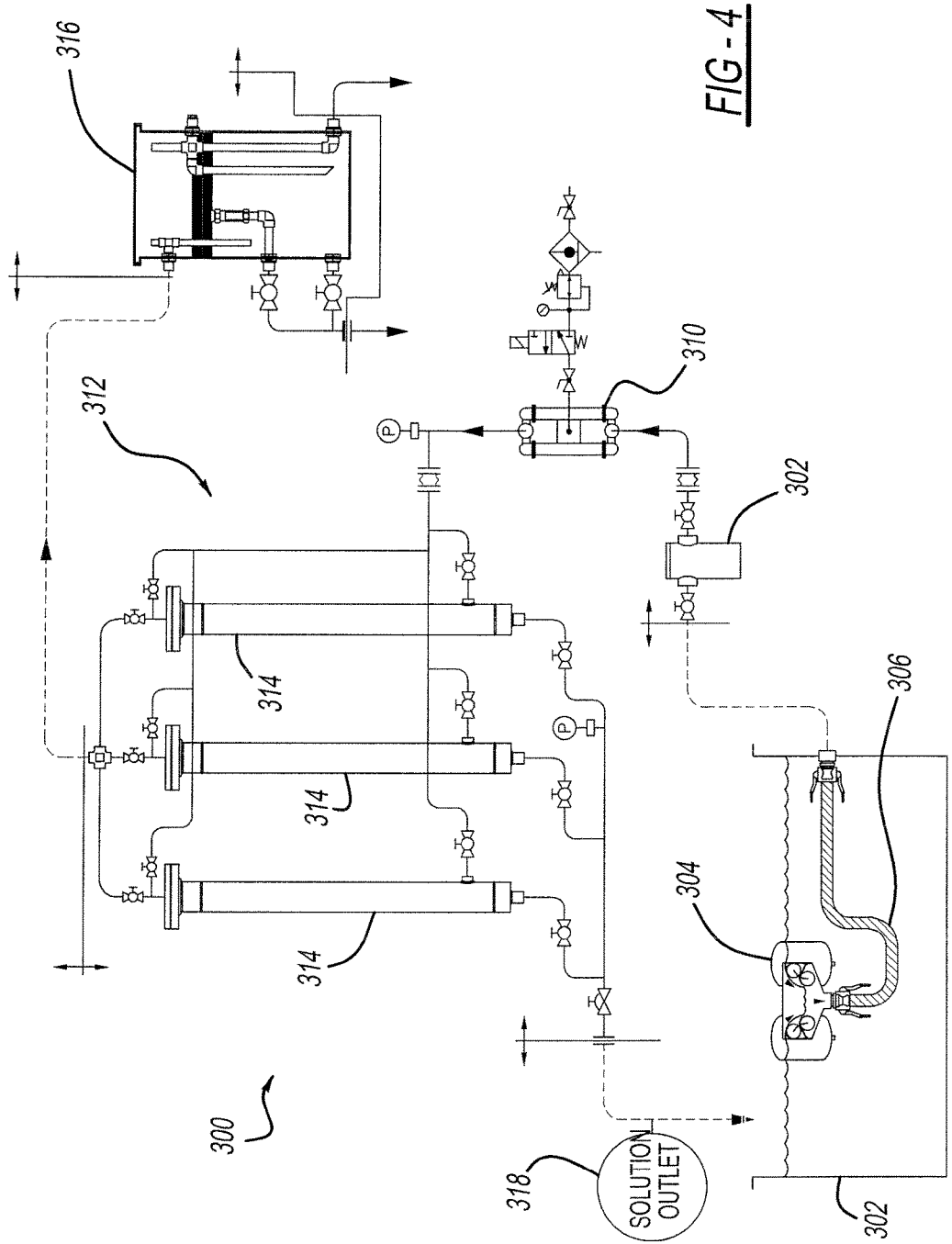

FLOATING CHOPPER SLUDGE WEIR

CROSS-REFERENCE TO RELATED APPLICATIONS

This application claims the benefit of U.S. Provisional Application No. 62/300,312, filed Feb. 26, 2016 and U.S. Provisional Application No. 62/277,682, filed Jan. 12, 2016. The disclosures of the above applications are incorporated herein by reference.

FIELD OF THE INVENTION

The present invention relates to systems for filtering contaminants such as paint sludge from a solution.

BACKGROUND OF THE INVENTION

During the manufacture of painted parts, such as automotive body parts, industrial wastes are produced. By-products such as paint sludge particles are produced and require proper disposal. Systems for concentrating, filtering and removing paint sludge particles from mixtures derived from industrial solutions are necessary to meet environmental standards.

A common technique for capturing paint overspray/airborne paint particulate produced when operating a paint spray booth is to capture the particulate in a waterfall backdrop within the spray booth. The resulting liquid-and-particulate fluid mixture is then channeled into a suitable system in which the paint particulate is substantially removed from the liquid. The filtered liquid is thereafter advantageously recirculated back to the spray booth's waterfall backdrop to capture more airborne paint particulate.

The paint sludge system discussed above often require large amounts of liquid to be filtered. This in turn requires larger pumps and a larger or greater number of filters if necessary, to be used. Thus it is desirable to design systems that concentrate contaminate (i.e., paint sludge) in order to eliminate filtering and separating large volumes.

One problem that occurs is that foam and coagulated paint particles (i.e., paint sludge) form on the surface of the liquids in the various contaminant and consolidation tanks. In order to collect the paint sludge floating on the surface of the liquid a floating weir having a suction hose is used to remove paint sludge floating on the surface of the liquid in the various tanks. However when the amount of material floating on the surface of the liquid is too great the suction hose connected to the floating weir can become clogged with a paint sludge blockage. When such blockages occur the suction hose continues to draw liquid out of the paint sludge blockage, which makes the paint sludge blockage become more solid and plug the suction hose; resulting in failure of the portion of the system including the floating weir. It is desirable to prevent paint sludge blockages and plugs from forming in the suction hose or at the floating weir outlet.

BRIEF DESCRIPTION OF THE DRAWINGS

The present invention will become more fully understood from the detailed description and the accompanying drawings, wherein:

FIG. 4 is a schematic view of a fourth embodiment of the invention;

DETAILED DESCRIPTION OF THE INVENTION

The following description of the preferred embodiment(s) is merely exemplary in nature and is in no way intended to limit the invention, its application, or uses.

Figure 1:
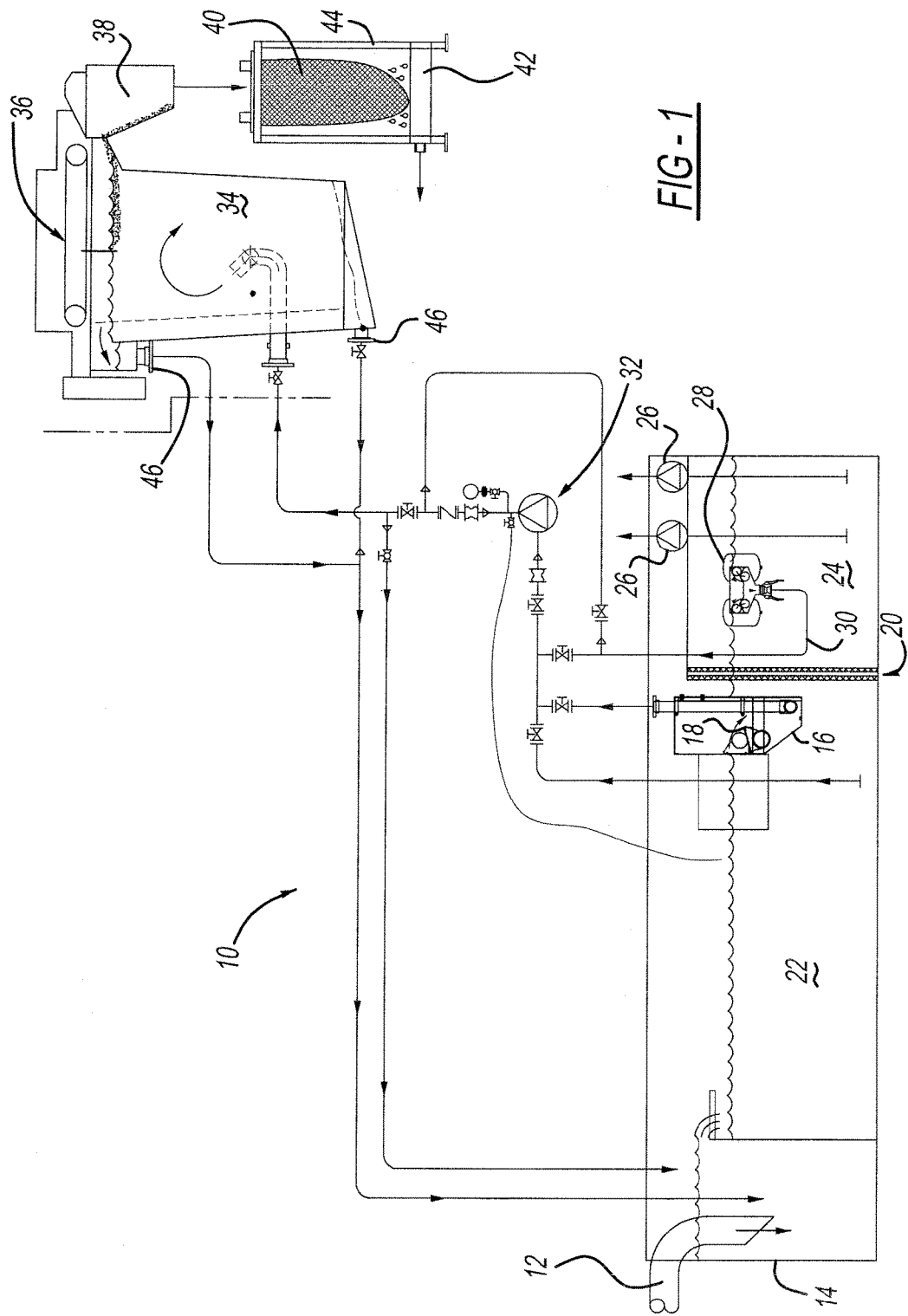
FIG. 1 is a schematic view of a first embodiment of the invention.

Referring to FIG. 1 a schematic diagram of a system 10 for consolidating and removing contaminate from a fluid mixture. The fluid mixture containing contaminate such as paint sludge particles or oils contained in a solution, such as water or a hydrophobic wash solution which together form a fluid mixture. The fluid mixture is obtained from the waterfall of a paint spray booth and/or a catch basin for spray painting or washing automotive parts. The waterfall and catch basin is channeled through an inlet pipe 12 or spray header that empties into a contaminate tank 14.

The contaminate tank 14 in this particular embodiment is quite large and can hold approximately 5,000 to 150,000 gallons. However, it is possible to a contaminate tank 14 of virtually any size to be used if needed. Within the contaminate tank 14 a stationary weir 16 is positioned to operably align with the surface of the fluid mixture contained in the contaminate tank 14. The stationary weir 16 has a hinged door 18 that is connected to a float that opens and closes to allow the fluid mixture to enter the stationary weir 16. When used in a paint sludge removal application the fine particles of paint will float on the surface of the fluid mixture in the contaminate tank 14 and be trapped or gathered by the stationary weir 16 which has the hinged door 18 located adjacent the surface of the fluid mixture.

The contaminate tank 14 is divided by one or more pump screens 20 so that the contaminate tank has a first section 22 and a second section 24. The pump screens 20 aid in keeping some of larger particles of paint or booth debris from crossing from the first section 22 into the second section 24. In the second section 24 is one or more booth pumps 26 which function to recycle or supply solution back to the manufacturing processes. One example is where the booth pumps 26 will pump solution back to the waterfalls in the paint spray booths. Thus it is important to prevent large particles of paint from building up within the second section 24.

Despite the fact that the pump screens 20 remove the paint sludge on the surface of the fluid mixture in the second section 24 in order to block the passage of larger paint particles, smaller particles can still pass and enter the booth pumps 26. Due to the chemistry applied, small particles that pass through the screen can agglomerate in section 24. The problem can become more pronounced when the booth pumps 26 are shutdown the booth pumps 26 and their pipes will drain back into the contaminate tank 14. As a result some of the finer paint particles that made it past the pump screens 20 mixed with chemistry will accumulate on the surface of the second section 24. Thus it is desirable to prevent damage or overheating of the booth pumps 26 by removing the accumulated paint sludge in the second section 24. In order to resolve this problem a floating weir 28 is positioned in the second section 24. The floating weir 24 will operate to remove paint sludge in the second section.

The floating weir 28 is a free floating weir box that has a hose 30 connecting to the weir box for removing the paint sludge that is collected. The stationary weir and the floating weir 28 both are connected to a vacuum pump assembly 32 that facilitates the removal of the paint sludge and solution that becomes trapped by the stationary weir 16 and floating weir 28.

The vacuum pump assembly 32 moves the paint sludge to a consolidation tank 34 where the fluid mixture is more concentrated with paint sludge. The paint sludge will float to the surface of the consolidation tank because the specific gravity of the paint sludge with property chemistry, is less than the specific gravity of the solution. At the top of the consolidation tank 34 is a scraper assembly 36 that has a moveable scraper that moves along the surface of the consolidation tank 34. The scraper assembly 36 pushes the paint sludge into a contaminate chute 38 that empties the paint sludge material into a drying bag 40. In the drying bag wet paint sludge is gathered.

The drying bag 40 is porous and allows the solution to drip away from the paint sludge into a drip pan 42 where it can be removed or re-introduced back to the contaminate tank 14. Once the drying bag 40 has become full it can be removed and the dried paint sludge material can be disposed of. The drying bag 40 can also be contained in a canister 44 that can be heated to facilitate the evaporation or drying process of the paint sludge material. The consolidation tank 34 also has several drains 46 that allow the solution that has been separated from the paint sludge to be re-introduced back to the contaminate tank 14 so that it may ultimately be recycled through the booth pumps 26 back to the paint spray booth.

Figure 2:
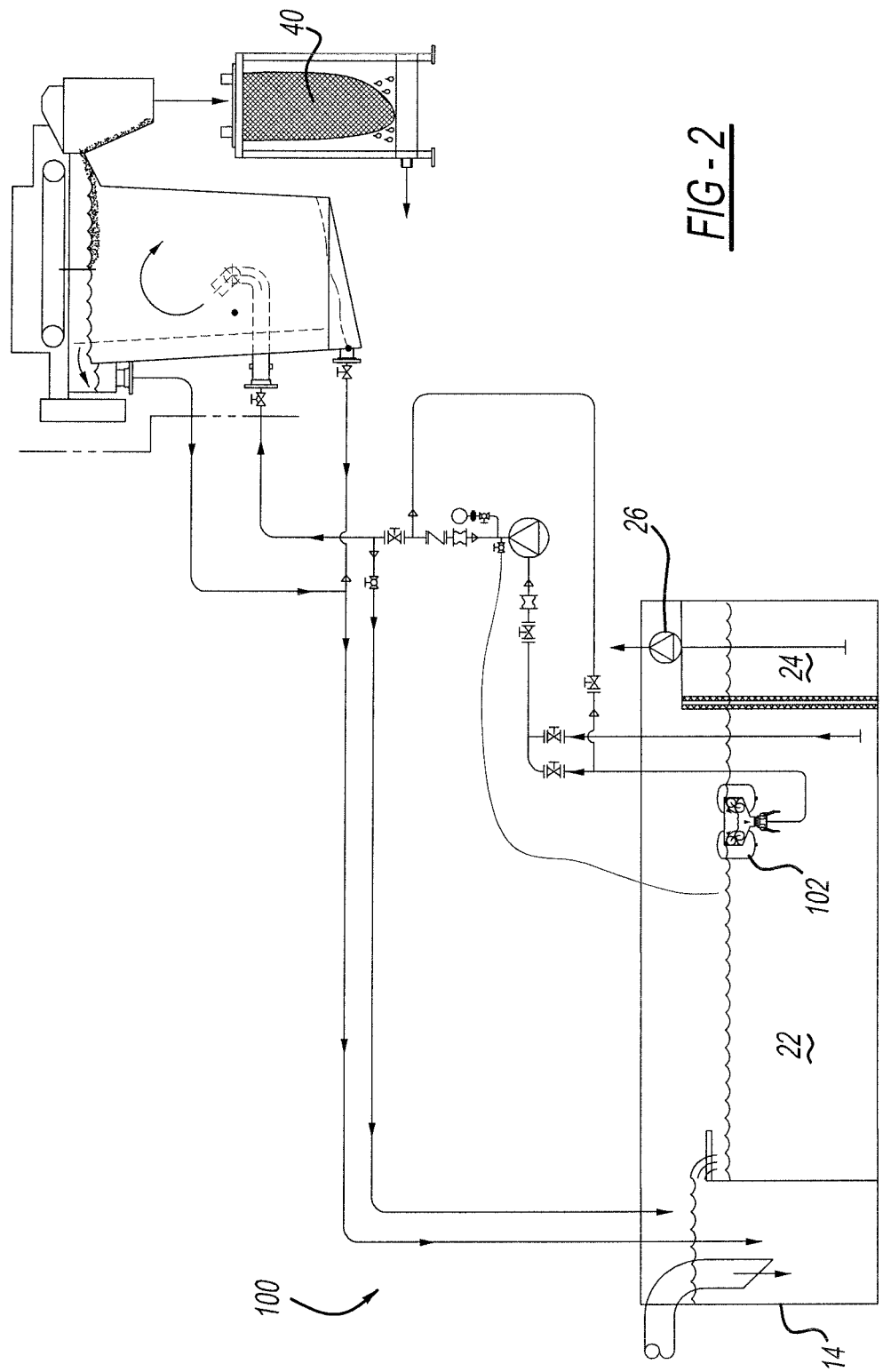
FIG. 2 is a schematic view of a second embodiment of the invention.

Referring now to FIG. 2 an alternate system is shown. Like reference numerals will be used to indicate structures similar to those shown in FIG. 1. A system 100 shown in FIG. 2 is similar to the system shown in FIG. 1. The main difference is that this particular system does not have a stationary weir, but instead has a floating weir 102 within the first section 22 of the contaminate tank 14. The second section 24 of the contaminate tank does not have a weir box within and only has a single booth pump 26. The type of system shown in FIG. 2 would be for a smaller type of operation wherein a lower volume of fluid mixture such as 200-2000 gallons would need to be filtered. However, it is possible to a contaminate tank 14 of virtually any size to be used if needed.

The type of system depicted in FIG. 2 provides more level control as well as eliminating the problem of pump cavitation. In paint sludge recovery applications the surface of the contaminate tank 14 can become covered with foam or coagulated paint sludge. This can cause existing paint sludge recovery systems to misread the true fluid levels in the contaminate tank 14. For example some systems employ a sonic sensor to determine the fluid level. Foam or coagulated paint sludge can give a false reading indicated that the liquid levels in the tank are significantly higher than the true liquid level. The floating weir of the present invention solves this problem because it is always on the surface of the liquid in the contaminate tank 14. This eliminates any issues of not having enough liquid to supply to the system which can result in cavitation of the pump. Additionally this type of system would allow for the easier re-location or if a user anticipates moving the system to various locations in order to find the "best" location within their facilities. Also this type of system is smaller and would reduce the overall installation costs that would normally be incurred for larger systems.

Figure 3:
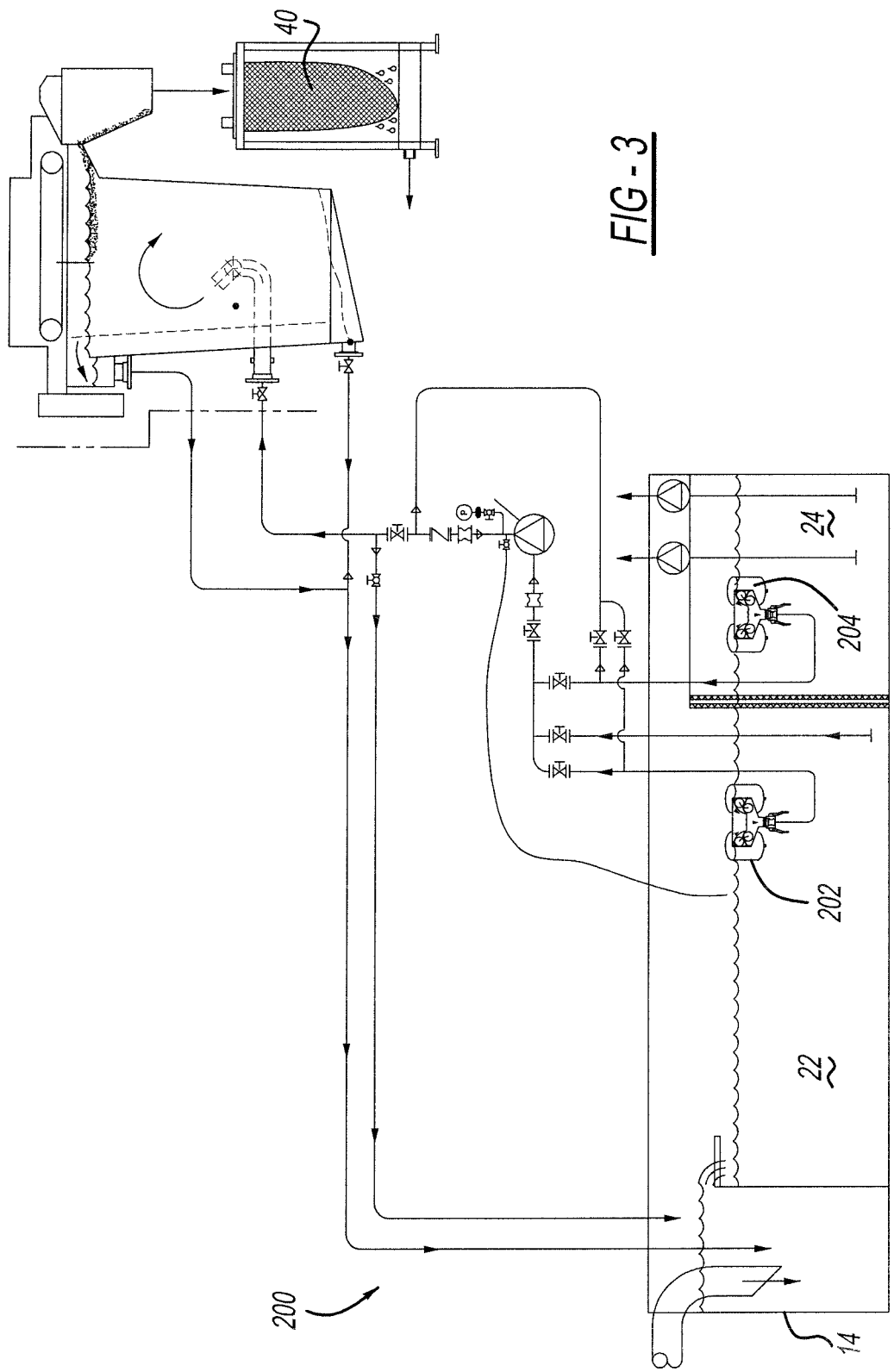
FIG. 3 is a schematic view of a third embodiment of the invention.

Referring now to FIG. 3 wherein like reference numerals are used to indicate similar structures that were indicated in FIGS. 1 and 2. A system 200 is depicted as having a first floating weir 202 positioned in the first section 22 of the contaminate tank 14. A second floating weir 204 is positioned in the second section 24 of the contaminate tank 14. The contaminate tank 14 in this type of application could be between 200 and 10,000 gallons. However, it is possible to a contaminate tank 14 of virtually any size to be used if needed.

This application shown in FIG. 3 wherein two floating weirs are used is advantageous in systems where there are plants that do not have a central waste treatment system and a large centralized system would not be practical. In large systems as well as other smaller types of systems the systems will be shut down so that the spray booths can be cleaned. During the cleaning process the liquid level in the contaminate tank 14 will rise due to liquid being added from the cleaning process. The only way the liquid level in the contaminate tank 14 returns to normal is for evaporation to occur. In the meantime the system will run with liquid levels that are above the normal operating levels. The use of floating weirs solves this problem because the weir is always as on the surface of the liquid in the contaminate tank 14. Thus the floating weirs are always at normal operating levels.

Referring now to FIG. 4 a schematic embodiment of an oil skimmer system 300 is generally shown. In this particular embodiment a contaminate tank 302 receives a fluid mixture of solution and oils from an auto part treatment booth. Prior to spray paint, auto parts the parts must be washed and treated in order to remove any oil residues that are present on the surface of the part, otherwise the oil residue can cause bubbling or peeling of the paint. The oil residue is often applied during transport in order to prevent the part from rusting or becoming scratched. Secondly oil residues can also sometimes be present as a result of the cutting and pressing processes used to create the part. A solution is used to wash the part to remove the residue from the part surface. This solution is collected in the contaminate tank 302 where the oil can be separated from the solution and the solution can be recycled back to the treatment booth.

Within the contaminate tank 302 is a floating weir 304 that floats on the surface and skims the oil residue away from a majority of the fluid mixture. Connected to the floating weir 304 is a suction hose 306 that leads to a strainer 308 wherein unwanted solid particles are removed prior to filtration. The solid particles can be metal shavings from the cutting and manufacturing process and their removal is important because they can clog or damage the filtration system. After passing through the strainer 308 the oil residue and solution mixture passes through a pump 310 which supplies the suction to the floating weir 304. The pump 310 in one embodiment can be a diaphragm pump; however, it is possible for virtually any style of pump to be used as long as the pump does not emulsify the solution. The solution is then passed to an oil/water hydrocyclone unit 312 which have one or more filtration columns that separate the oil residue from the solution. After filtration the waste oil progresses to a decant tank where it is further concentrated, collected and separated. The solution that has been separated by the hydrocyclones 314 is removed and re-introduced through a solution outlet 318 back to the contaminate tank 312 wherein a booth pump (not shown) can draw fluid from the contaminate tank 314 and introduce it to the spray headers or educators for agitation at the surface of the part to be washed.

Figure 5A:
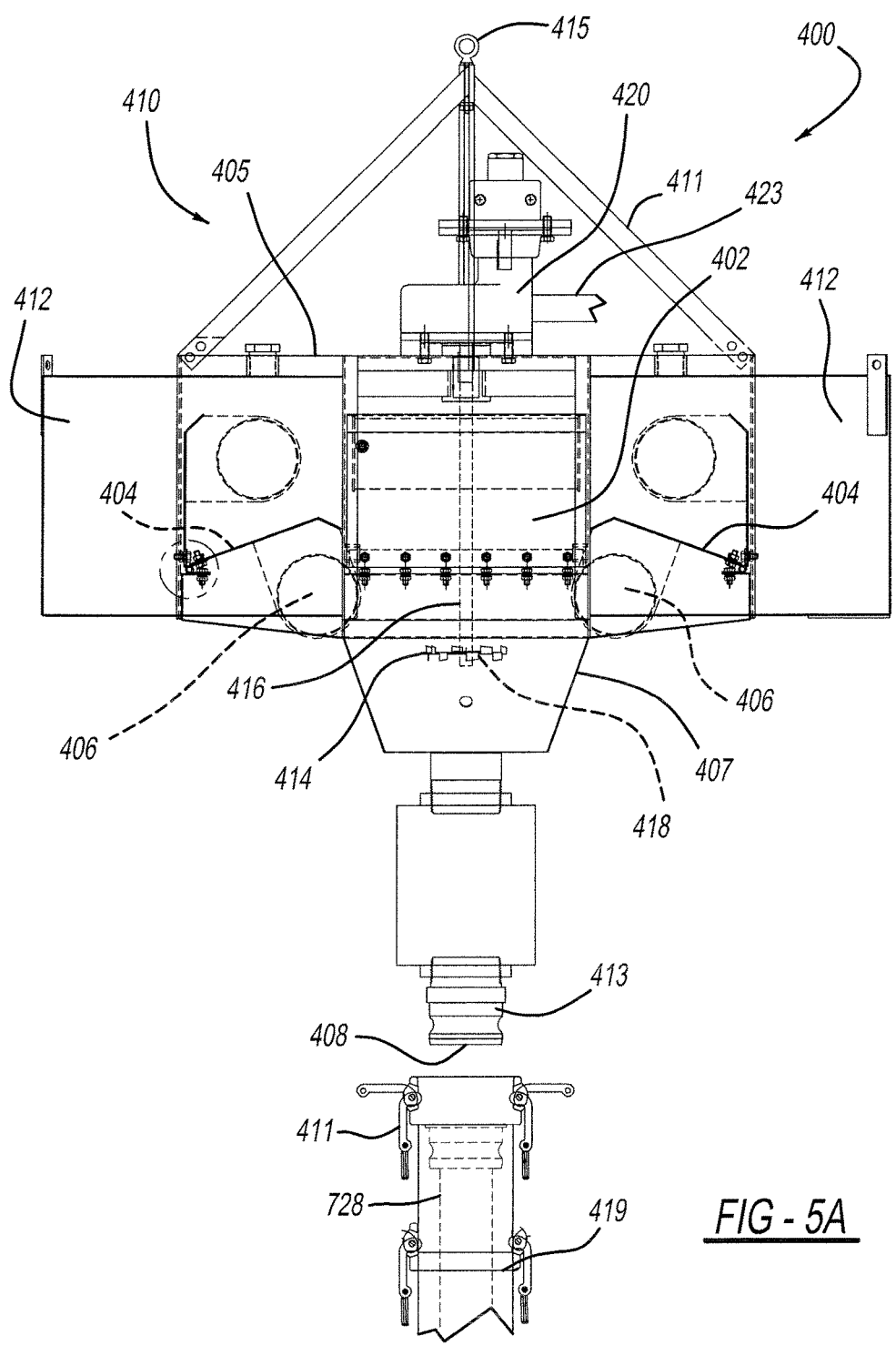
FIG. 5A is an overhead plan view of the floating weir.
Figure 5B:
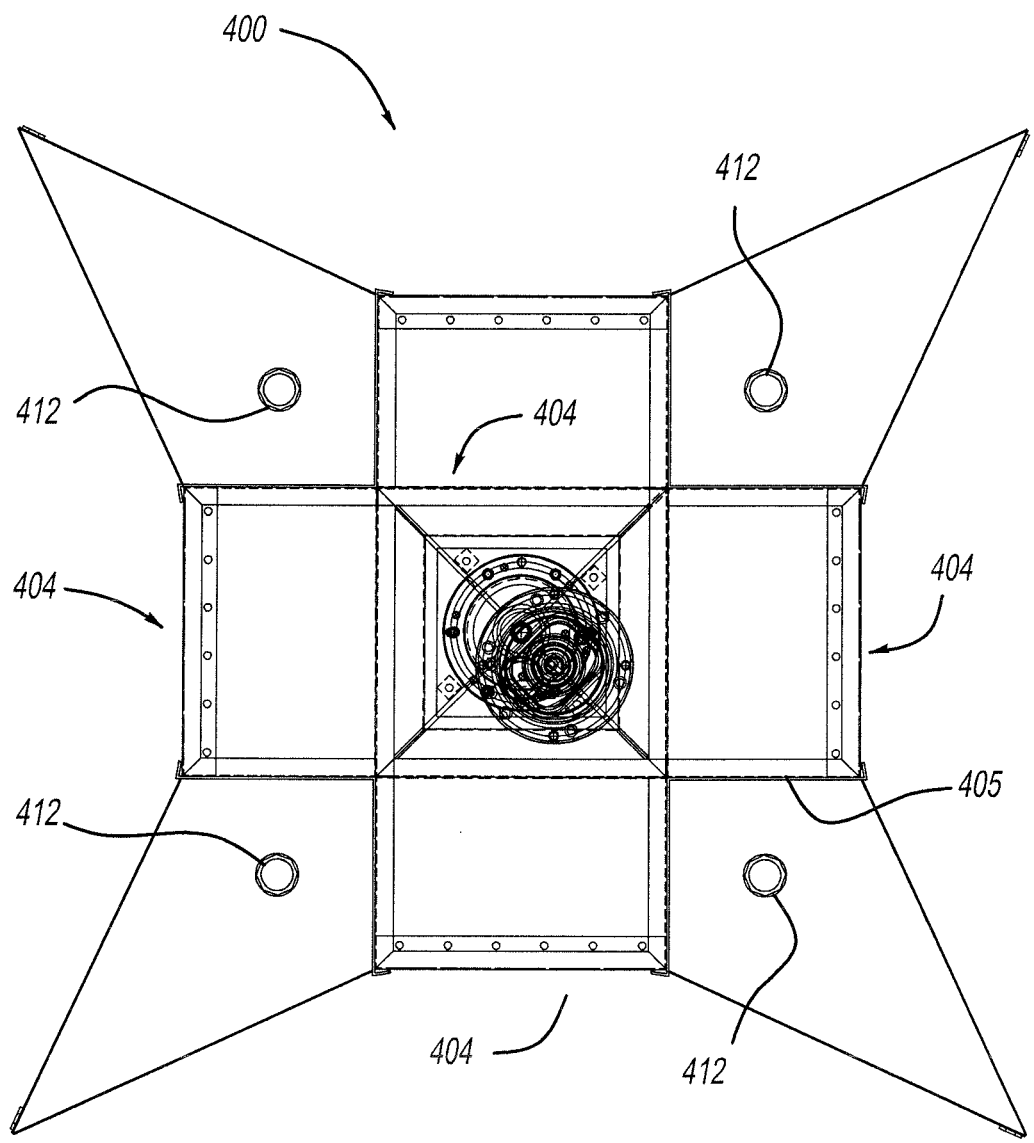
FIG. 5B is a cross-sectional side plan view of the floating weir.

Referring now to FIGS. 5A-5B a floating weir 400 in accordance with one embodiment is shown and described. The floating weir 400 can be used in any of the systems described in FIGS. 1-4, or it can be used in a type of system where it is desirable to remove contaminates floating on the surface of a tank. The floating weir 400 is connectable to a suction hose 409 having a coupler 403. The floating weir 400 has a suction box 402 that collects contaminate (e.g., paint sludge) from the tank or environment that the floating weir is placed within. The suction box 402 has four hinged doors 404 that each have a float member 406 attached to the back side of each hinged door 404 for controlling the opening and closing of the door. The float members 406 float on the surface of the liquid contained within the suction box 402 in order to control the position of the hinged door 404 and for moving the hinged door 404 between the open position and closed position. This in turn controls the ingress of liquid mixture from the tank into the suction box 402. When the liquid mixture levels in the suction box 402 are low the hinged door 404 will be more open and when the liquid mixture levels in the suction box 402 are high the hinged door 404 will be more closed.

The floating weir 400 has floatation regions 412 that are formed in a housing 405 of the floating weir 400. The flotation regions 412 can take many forms, such as for example regions of buoyant material or air chambers formed in the housing, that make the floating weir buoyant and enable the floating weir 400 to float on top of the surface of the liquid that the floating weir 400 is placed within. The suction box 402 has an outlet 408 located below the suction box 402. There is a conical portion 407 between the suction box 402 and the outlet 408 that reduces the volume of liquid mixture between the suction box 402 and the outlet 408, which assists in constricting or throttling the liquid mixture prior to being sucked through the outlet 408. Also the conical portion 407 helps to stabilize the buoyancy of the floating weir 400 by creating a ballast weight located below flotation regions 412 of the floating weir 400. Additional weight can be added to the inside surface or outside surface of the conical section 407 to further create ballast in order to prevent the floating weir 400 from tipping over. While the conical section 407 is shown and described in the present embodiment, it is within the scope of this invention for the conical section 407 to take some other shape or to not be present between the suction box 402 and outlet 408.

A suction or suction hose 409 includes the coupler 403 which is a fitting designed to fit over the outer surface or a ribbed nozzle 413 of the outlet 408. The ribbed nozzle 413 has rips or raised bumps formed on the outer surface that can also include rubber seals for frictional engagement with the coupler 403. The coupler 403 also includes a locking tab or tabs 411 that fasten the coupler 403 onto the ribbed nozzle 413.

The floating weir 400 also includes a lifting eyelet 410 positioned at the top of the suction box 402 for removing the floating weir 400 from the tank that the floating weir is placed within. The lifting eyelet 410 has two or more connection arms 411 that connect to the housing 405 and extend to an eyelet 415 so that the eyelet 415 is positioned at a distance from the suction box 402.

One problem that occurs is that when paint sludge will become clogged with in the vacuum or suction hose 409 as the paint sludge moves from the suction box 402 to the outlet 408. When the semi-solid paint sludge blockage becomes lodged within the suction hose 409, a pump connected to the suction hose 409 will continue to draw water out of the paint sludge blockage creating a paint sludge plug, which is a solid mass of paint compared to the semi-solid paint sludge blockage having greater water content. When the paint sludge plug or paint sludge blockage forms within the suction hose 409 the result is a failure of the floating weir 400, because it can no longer remove paint sludge from the surface of the contaminant tank or consolidation tank.

In order to prevent a paint sludge plug or paint sludge blockage from forming, the floating weir 400 has one or more chopping blades 414 that are fixed to a shaft 416 and rotate. The shaft 416 has an end 418 that terminates within and positions the one or more chopping blades 414 in the conical portion 407 of the floating weir 400. The shaft 416 extends from the end 418 through the suction box 402 and extends above the outer surface of the suction box and is connected to by way of a coupling, or extends into an air motor 420. The air motor 420 is connected to an air hose 422 that drives the air motor 420 to rotate the shaft 416, which in turn rotates the one or more chopping blades 414. When the one or more chopping blades 414 rotate, paint sludge material that is agglomerated within the suction box 402 and the conical portion 407 are chopped and or broken up through agitation of the liquid, prior to moving through the outlet 418 and into the suction hose 409. Chopping up or agitating the paint sludge within the suction box 402 and conical portion 407 helps to prevent the formation of paint sludge blockages and subsequent paint sludge plugs, downstream within the suction hose 409.

Figure 11:
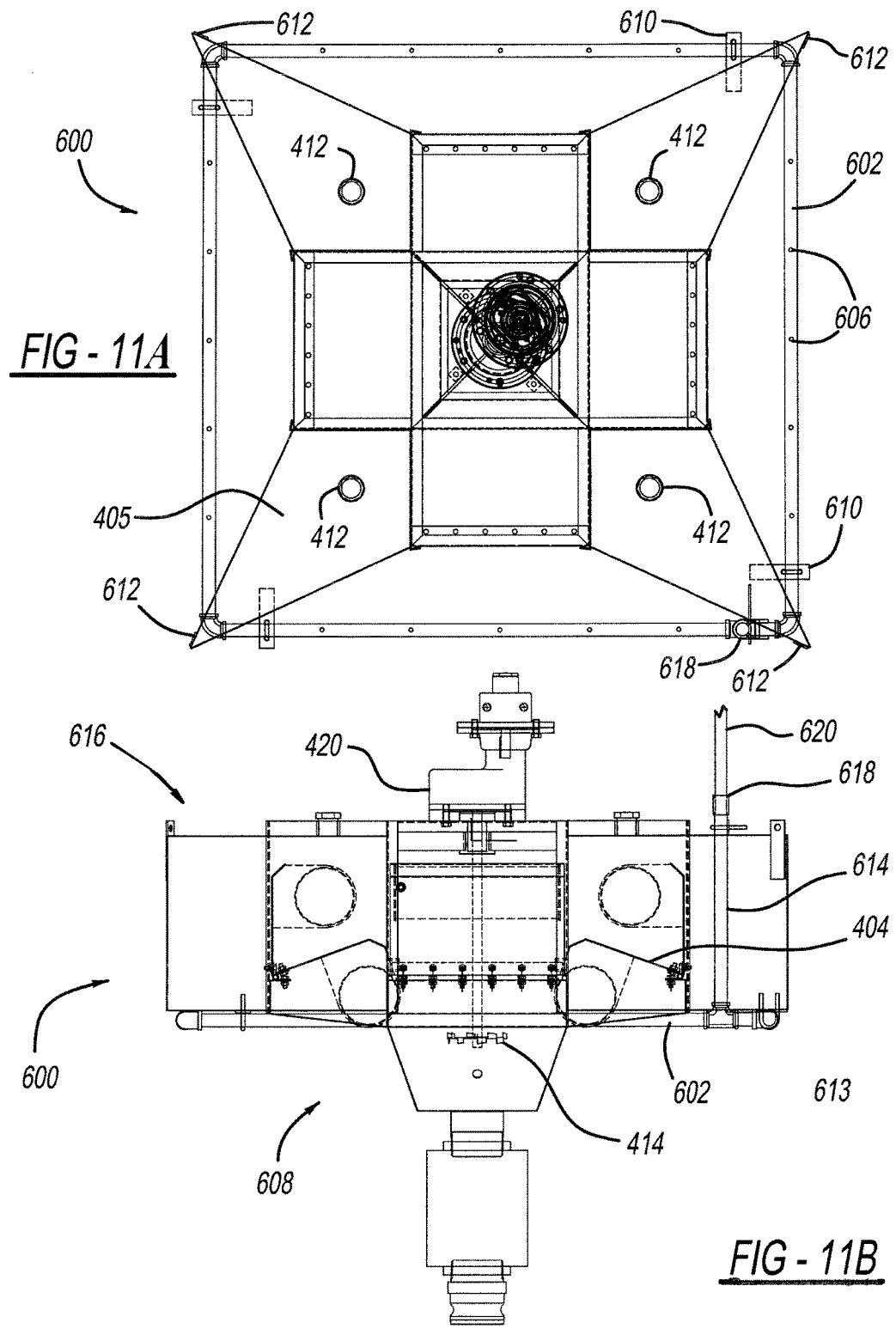
FIG. 11A is an overhead plan view of the floating weir in accordance with another embodiment of the invention.
FIG. 11B is a cross-sectional side plan view of the floating weir in accordance with another embodiment of the invention.

Referring now to FIGS. 11A-11B an additional embodiment of a floating weir 600 is shown. Reference numbers from FIGS. 5A-5B are repeated to designate the same or similar structures. The floating weir 600 has an air frame 602 attached to and extending around a housing 405 of the floating weir 600. While the air frame 602 is shown to be extending just under each of four corners 612 the entire housing 405 it is within the scope of this invention for the air frame 602 to not completely extend around the housing 405. The air frame 602 has a hollow channel configured to allow air to pass through the air frame 602 and exit a plurality of apertures 606 on an external surface of the air frame 602. The plurality of apertures 606 can be on any surface and are shown facing on a top side surface 616 of the housing 405, but can also face a bottom side 608. In the embodiment shown the air frame 602 has one or more clamps 610, more specifically four clamps 610 are shown. The clamps 610 are used to connect the air frame 602 to the housing 405. The clamps 610 are connected directly to the air frame 602 by welding. In another aspect of the invention the clamps 610 or fasteners that grasp and hold the air frame 602 can easily be removed for applications where the air frame 602 is not necessary or if the air frame 602 becomes damaged and needs to be replaced.

The air frame 602 has a vertical line 614 coupled to a T connection 613 that extends upward from the bottom side 608 to the top side 616 of the floating weir 600. The vertical line 614 terminates at an inlet coupling 618 that is connected to an air source 620, such as an airline or hose. The air supply source can be separate from the air hose 422 that drives the chopping blades of the weir. However, it is also within the scope of this invention for the inlet coupling 618 of the air frame 602 to be connected to a conduit on the motor portion 420 that drives the chopping blades 414, thereby allowing the air frame 602 to receive air from the same air hose 422 as the motor 420 of the chopping weir blades.

While the vertical line 614 is shown extending from the bottom side 608 to the top side 616 it is within the scope of this invention for other connections to the air from 602 to be used. For example the inlet coupling 618 can be connected directly to the T connection with the air source being connected at the bottom side 608 of the floating weir 600.

The plurality of holes 606 on the air frame 602 allow air bubbles to pass through the air frame 602 from the hollow channel, thereby causing the water surface adjacent the inlet doors 404 and the water inside the housing 405 to be turbid when compressed air passes through the plurality of holes 602. This agitates the paint sludge prior to being pulled into the chopping blades 414 and assists in breaking up larger paint sludge agglomerates.

Figure 6:
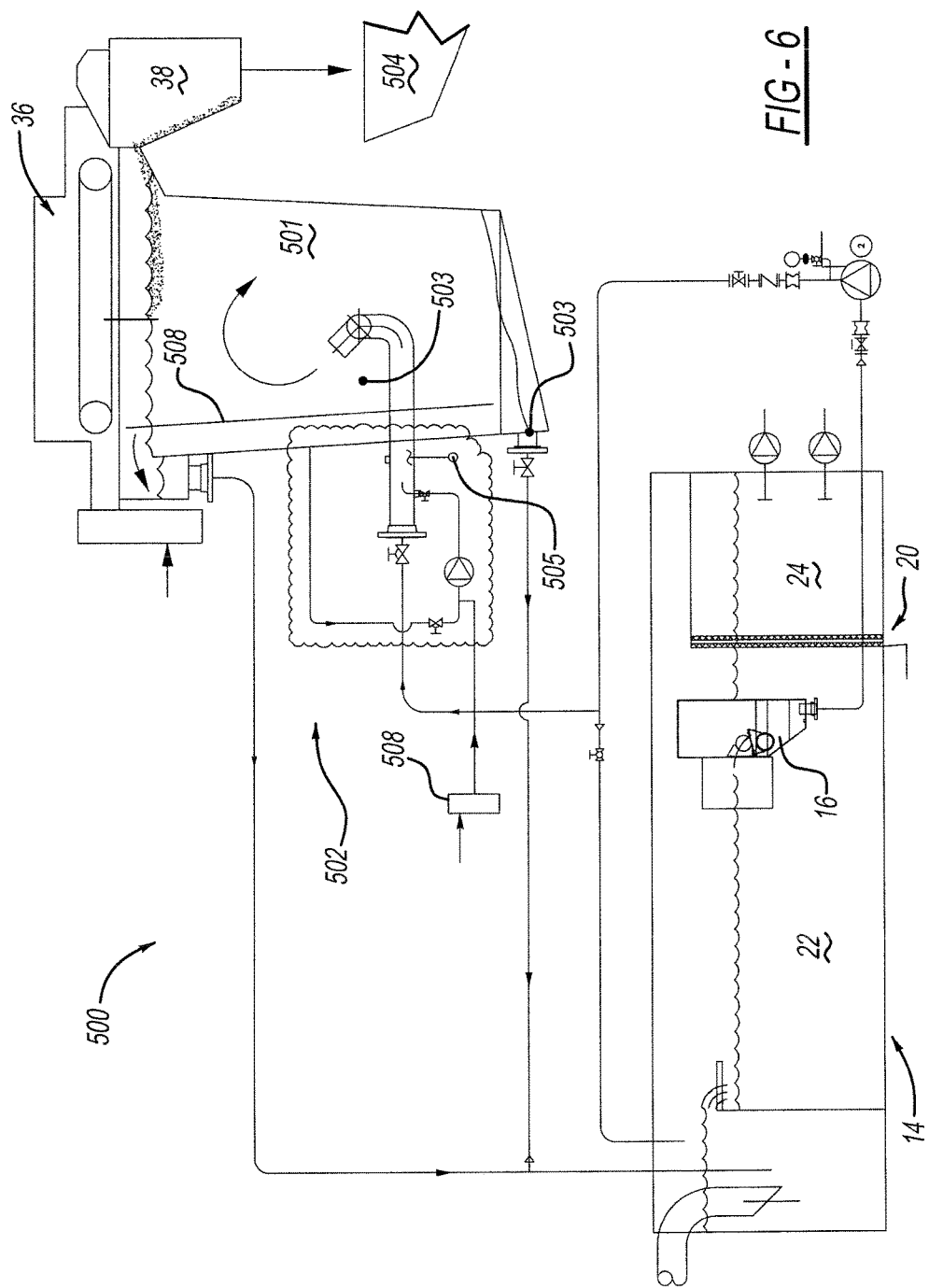
FIG. 6 is a schematic view of a fifth embodiment of the invention.

Referring now to FIG. 6, an alternate system using a induced air flotation arrangement is shown. Like reference numerals will be used to indicate structures similar to those shown in FIG. 1. A system 500 is shown as having a consolidation tank 501 that has then modified to include a induced air flotation arrangement 502. While the present invention describes a consolidation tank 501 and induced air flotation arrangement 502 used in combination with a system having only a stationary weir 16 in the contaminate tank 14, it is within the scope of this invention for the alternate embodiment to be used in combination with one or more stationary weirs, or a combination of flotation and stationary weirs as set forth of the other embodiments in FIGS. 1-5. The use of the consolidation tank 501 in combination with the induced air flotation arrangement 502 injects gas bubbles and liquid into the consolidation tank 501 that will further contribute to the separation of the contaminate from the fluid mixture within the consolidation tank 501. It has been found that introducing induced air will increase the efficiency of the consolidation tank 501 by causing the contaminate particles (e.g. paint sludge to float at the surface of the consolidation tank for removal by the scraper assembly 36). As the scraper assembly 36 removes contaminate, it is deposited into the contaminate chute 38 where it is then introduced to a contaminate treatment device 504.

Figure 10:
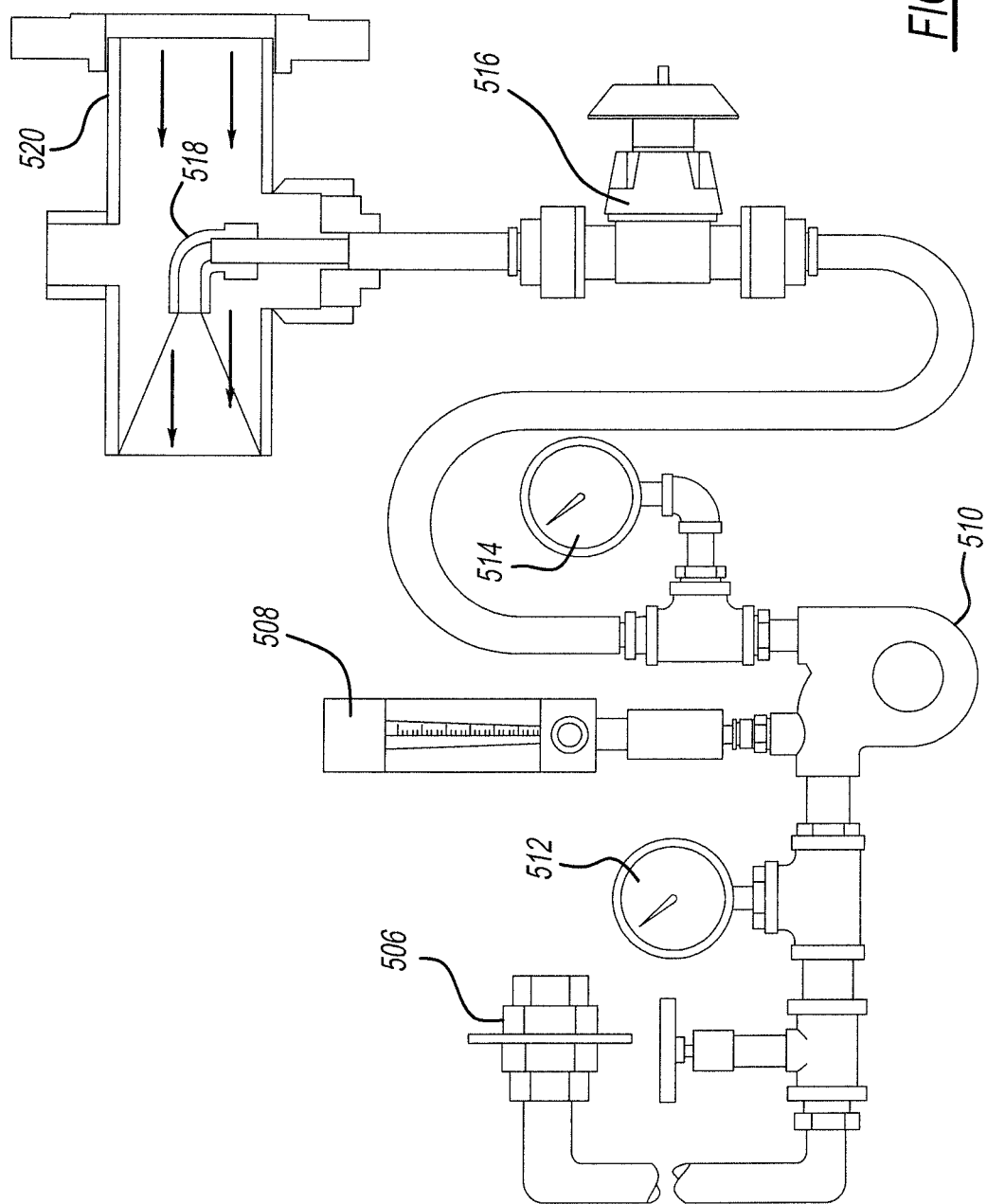
FIG. 10 is a schematic diagram of an induced air flotation arrangement.

FIG. 10 is a schematic diagram of the induced air flotation arrangement 502 which has a tank wall coupling 506 that serves as a fluid mixture source for the induced air flotation arrangement 502. Referring to FIGS. 6 and 10, the tank wall coupling 506 is connected through the wall of the consolidation tank 501. The consolidation tank 501 further includes a separator plate 508 that extends vertically through a portion of the consolidation tank and is open near the bottom of the tank to allow fluid mixture that has separated from the solid contaminates to pass under the separator plate. This ensures that the fluid mixture located between the wall of the consolidation tank and the separator plate 508 is generally clean and free of any paint sludge materials. Therefore, the fluid mixture received through the tank wall coupling 506 is generally free of any solid paint sludge material.

The induced air flotation arrangement 502 further includes an atmospheric air source 508, which in the present embodiment of the invention is an atmospheric air flow meter with a check valve or solenoid valve that controls the flow of air from the atmosphere into the arrangement 502. While the gas source 508 is described as being a connection to atmosphere, it is possible to use other types of gas sources such a compressed air source or other types of compressed gases. The induced air flotation arrangement 502 further includes an aeration pump 510 that combines and pressurizes the gas and fluid mixture. Operation of the aeration pump 510 creates a vacuum upstream as fluid is drawn in from the tank wall coupling 506. The vacuum is measured using a first vacuum gauge 512. The amount of vacuum created is also indicative of the amount of air being brought in thorough the gas source 508 because of the suction created by the aeration pump 510. The pressure being output from the aeration pump 510 can be measured by a second pressure gauge 514.

After the gas and fluid mixture has been combined it is collectively referred to as the dissolve gas, which is then passed through a diaphragm valve 516 onto a connection 518 that is placed within the stream of a micro-aeration inlet 520 that feeds to the consolidation tank 501.

The micro-aeration inlet 520 receives fluid mixture containing contaminate from the stationary weir 516. In other embodiments, the micro-aeration inlet 520 will receive contaminate and fluid mixture from the floating weirs or the combination of the various weirs discussed in the embodiments shown in FIGS. 1-5.

The valve 516 can be any type of suitable one-way valve capable of allowing pressurized gas to pass through the valve to the micro-aeration inlet 520, but preventing the back-up of fluid through the valve 516. The present embodiment used a diaphragm valve. However, it is within the scope of this invention for other types of valves to be implemented.

The connection 518 is any suitable nozzle or outlet for placing the induced air into the stream of fluid flowing through the micro-aeration inlet 520. The present invention contemplates the use of compression tubing; however, it is possible for any other suitable tubing to be utilized.

The aeration pump 510 described in the present invention is contemplated as being an impeller style pump. However, it is within the scope of this invention for any other suitable pump for combining and pressurizing the gas and fluid mixture to be used. For example, other types of pumps such as gerotor or vane pumps could be utilized and are within the scope of this invention.

In another alternate aspect of the invention, the induced air flotation arrangement 502 further includes additional aeration ports 503 that input induced air mixture directly into different locations within the consolidation tank 501. This enhances the distribution of induced air in the consolidation tank 501.

In another alternate aspect of the present invention, it is optional to provide a chemical injection port 505 for injecting chemicals into the micro-aeration inlet 520. Chemicals injected are any suitable chemicals, such as polymers, that promote the coagulation and flotation of the paint sludge on the surface of the consolidator 501. The chemicals can be injected through their own independent injection port 505 or they can be injected into the arrangement 502 prior to the aeration pump 510.

Figure 7:
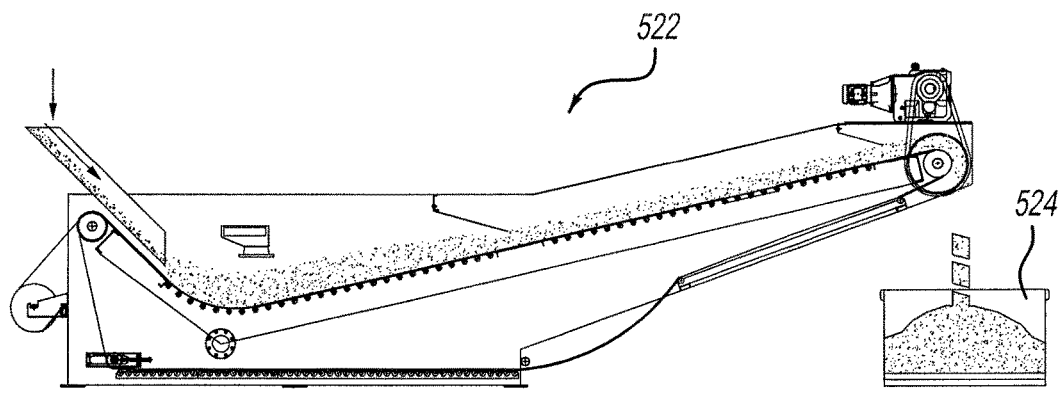
FIG. 7 is a schematic view of a conveyorized dryer.
Figure 8:
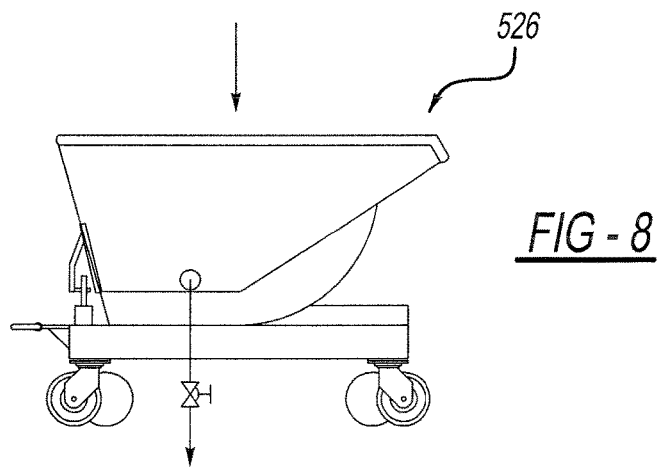
FIG. 8 is a schematic diagram of a self-dump hopper.
Figure 9:
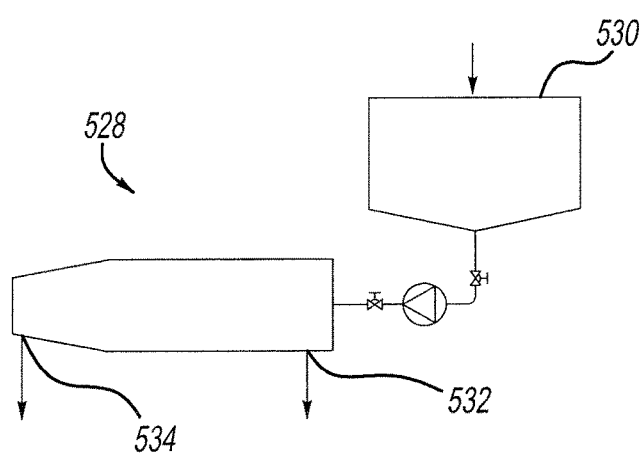
FIG. 9 is a schematic diagram of a centrifuge dryer.

Referring now to FIGS. 7-9, various contaminate treatment devices are shown. These contaminate treatment devices can be placed at the end of the chute 38 in FIG. 6 where the contaminate treatment device 504 is located. Alternatively, the contaminate treatment device 504 can be a drying bag 40 as shown in FIG. 1. Additionally, the drying bag 40, shown in FIGS. 1-3, can be interchanged with one of the contaminate treatment devices shown in FIGS. 7-9. FIG. 7 depicts a conveyorized dryer 522 for receiving contaminate from the chute 38 and moving contaminate along the conveyor while being dried and ultimately deposited into a container 524. FIG. 8 depicts a self-dump hopper 526 that receives contaminate from the chute 38. The self-dump hopper 526 allows for the manual removal of contaminate to a location where contaminate can be dumped for storage. FIG. 9 depicts a centrifuge dryer 528 where contaminate enters an opening 530 of the centrifuge and fluid mixture is separated from a first outlet 532 and solid contaminate is removed from a second outlet 534. While all the above embodiments of the invention discuss specific contaminate treatment desires, it is within the scope of this invention to use virtually any other type of device that dries contaminate and stores it for removal.

Figure 12:
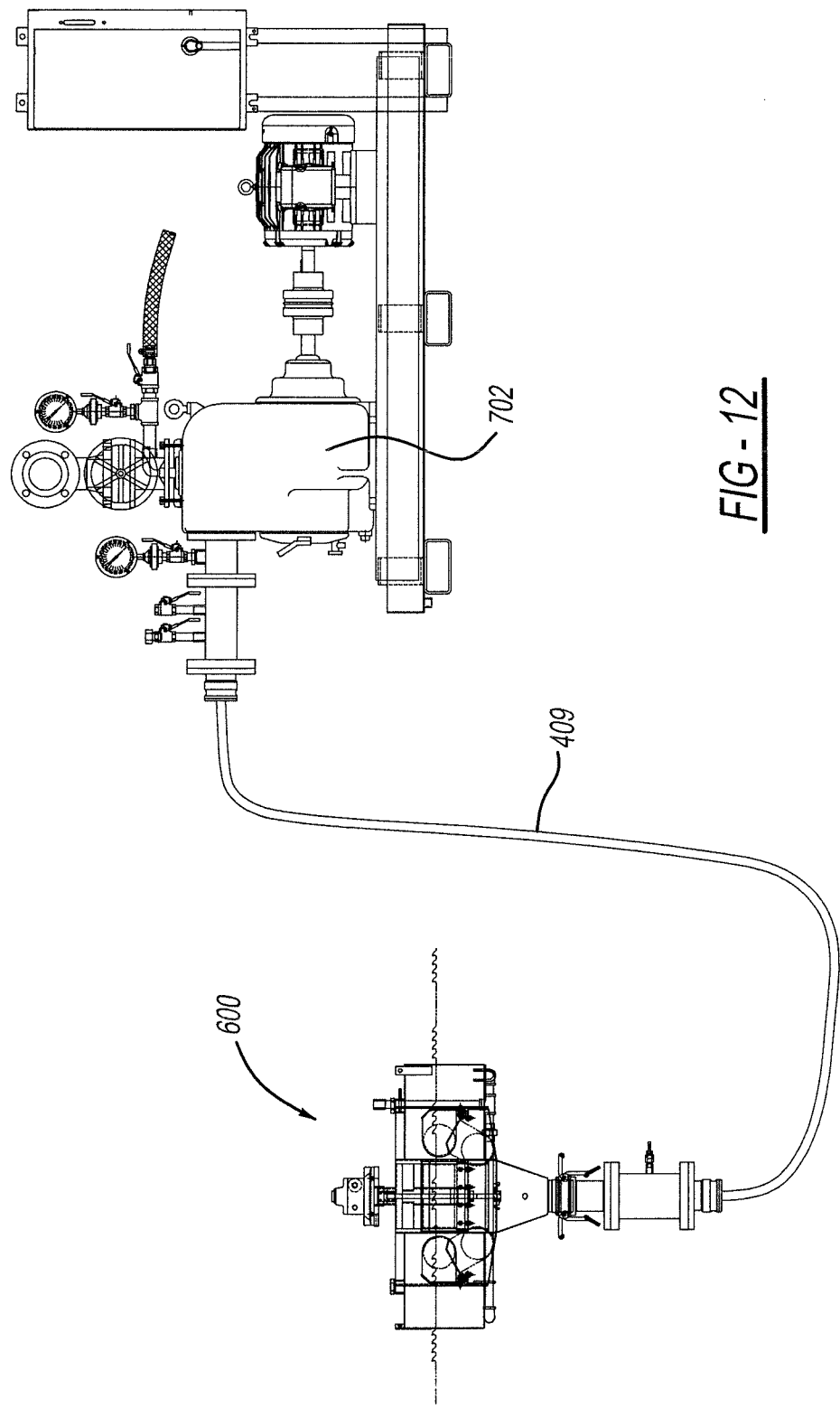
FIG. 12 is a side schematic view of a floating weir connected to an electric pump in accordance with one embodiment of the invention.
Figure 13A:
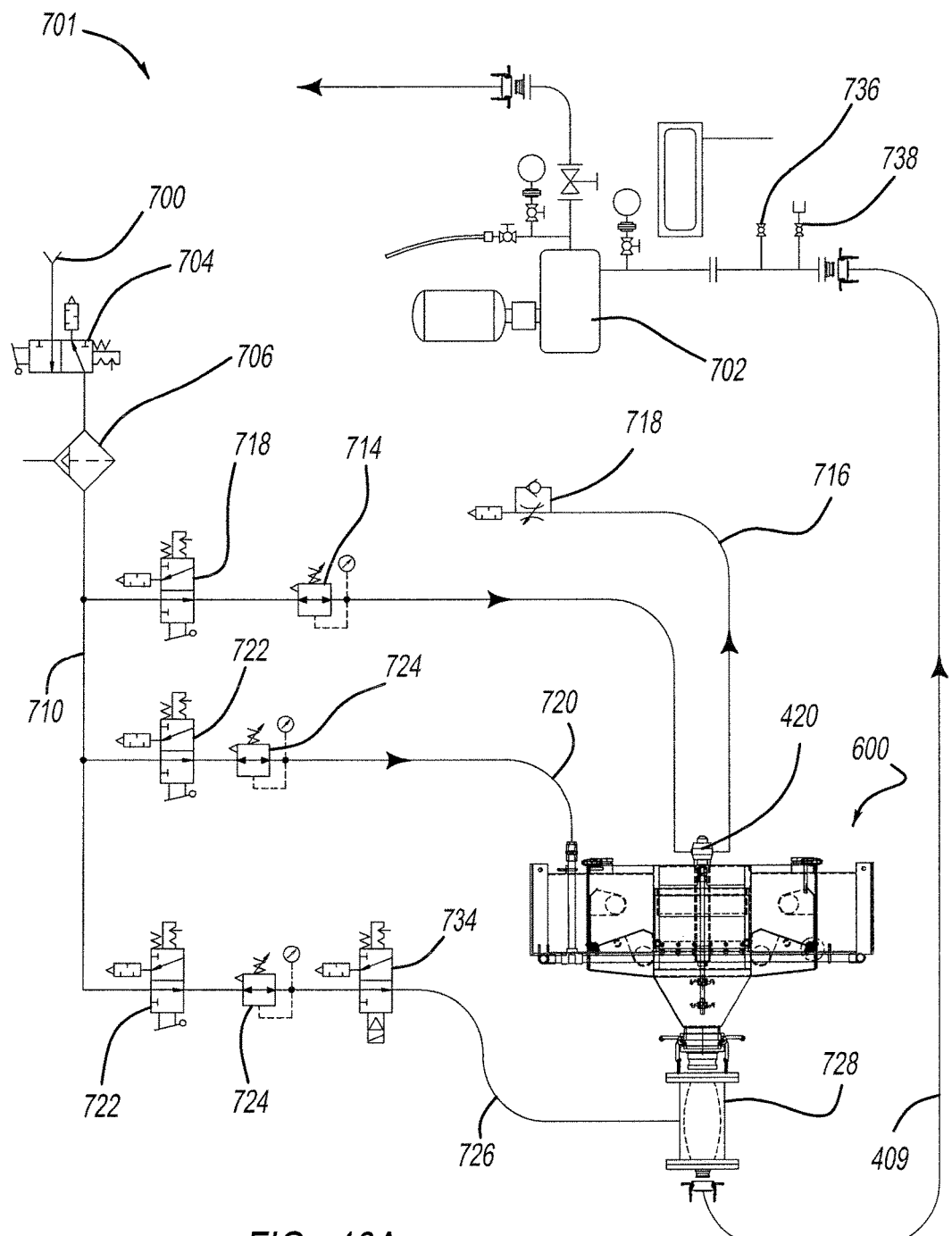
FIG. 13A is a schematic diagram of a self-priming air supply circuit using an electric pump for use on the floating weir in accordance with one embodiment of the present invention.
Figure 13B:
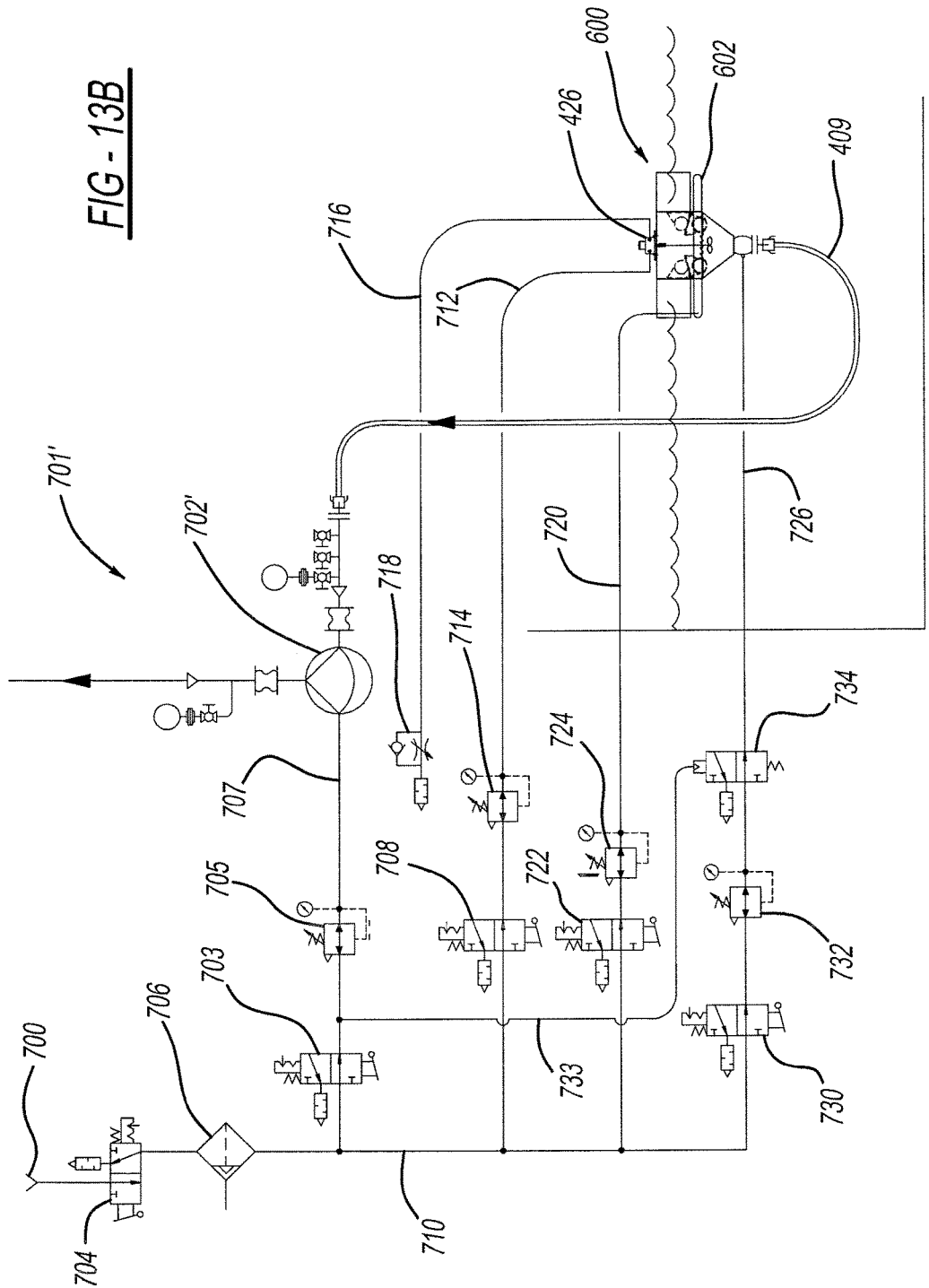
FIG. 13B is a detailed schematic diagram of a self-priming air supply circuit using an air driven pump for use on the floating weir in accordance with another embodiment of the present invention.

FIGS. 12, 13A and 13B the operational details of the floating weir 600 in with an air circuit 701 according to a first embodiment (FIGS. 12 and 13A) and an air circuit 701' according to a second embodiment (FIG. 13B). The difference between the first embodiment (FIGS. 12 and 13A) and second embodiment (FIG. 13B) is that the first embodiment uses an electric pump 702, while the second embodiment uses an a self-priming pump or diaphragm pump 702' that includes an additional air supply line and valves, which are described in greater detail below. As shown in the figures the air circuit 701, 701' includes an air source 700, that is a compressed air source that is connected to a main branch 710. In FIG. 13B the air source 700 provides compressed air to the self-priming pump or diaphragm pump 702', which is used to create the suction in the suction hose 409. The air source 700 also supplies compressed air to the motor 420 and airframe 602. The air source also provides air to the air frame 602.

The air source 700 includes an air inlet valve 704 that controls the flow of air from the air source 700 to the air circuit 701, 701'. Downstream of the air inlet valve 704 is a filter element 706 that filters the air entering the circuit 701. The air source 700 is an individual compressor pump or a branch from a large compressed air stream within a facility. The air circuit 701' of FIG. 13B includes a diaphragm supply valve 703 with a diaphragm pressure regulator 705 that supplies compressed air through a diaphragm air supply line 707 to the diaphragm pump 702'. The diaphragm pump 702' uses compressed air to create a suction in the suction hose 409 as described below.

The air circuit 701, 701' further includes an air motor valve 708 that controls the flow of air from the main branch 710 to an air motor supply hose 712. Downstream of the air motor valve 708 is an air motor regulator 714 that regulates the air pressure flowing through the air motor supply hose 712 to the air motor 420, thereby controlling the speed of the motor 420 and the rotation of the chopping blades described above. The air motor regulator 714 can be set to a specific pressure or range of pressures. Once air being supplied through the air supply hose 712 passes through the air motor 420 the air exits through an exhaust hose 716 which is regulated by a flow control valve 718.

Air flowing through the main branch 710 also supplies compressed air to an airframe hose 720. Air from the main branch 710 passes through selectively using an air aeration valve 722, which is an on-off valve that controls the flow of air from the main branch 710 to the airframe hose 720. Downstream of the air aeration valve 722 is an aeration regulator 724 that controls the air pressure moving through the airframe hose 720. The aeration regulator 724 can be set to a specific pressure or range of pressures.

Also extending from the main branch 710 is a primer hose 726 that connects to a pinch valve 728 connected to the coupler 403 at the outlet 408 of the floating weir 400, as also shown in FIG. 5A. The pinch valve 728 receives compressed air from the primer hose 726 in order to adjust the flow of liquid through the suction hose 409 when the diaphragm pump 702 is first started, in order to prime the diaphragm pump 702 and initiate suction with in the suction hose 409. The flow of compressed air through the primer hose 726 is controlled by a pinch air valve 730, which is an on-off valve that allows compressed air to flow from the main branch 710 into the primer hose 726. Downstream of the pinch valve 730 is a pinch valve regulator 732 that regulates the pressure in the primer hose 726, which can be a set pressure or range of pressures. Also provided is a pinch valve solenoid 734, located downstream of the pinch valve regulator 732 which controls the flow of compressed air through the primer hose 726, which acts on the pinch valve 728. After the pinch valve 728 there is the suction hose 409 which operably connects to the diaphragm pump 702. Between the diaphragm pump 702 and the suction hose 409 is an air vent valve 736 and water fill valve 738. The function of the air vent valve 736 and the water fill valve 738 will be described in the priming sequence below.

One of the situations encountered by operating the floating weir 600 is that it must be turned off and turned on for various reasons, but in particular when the floating weir is first placed in a tank of liquid the air hose 409 has air in it that causes it to float on the surface of the liquid. This makes it difficult to induce a suction in the suction hose 409, so it is desirable to provide a priming sequence the suction hose 409. During a priming sequence, when it is desired to start suction in the suction hose 409, the following steps occur. First the main air inlet valve 704 is opened allowing compressed air to flow from the source 700 into the main branch 710. It is within the scope of this invention for the main branch 710 to be a hose or tube different three way connections forming the air circuit 701. Next the pinch valve 730 is opened and the pinch valve regulator 732 is set to a desired pressure. Then the pinch valve solenoid 734 is deenergized in order to close the pinch valve 728 located at the junction of the suction hose 409 and the floating weir. The movement of the pinch valve solenoid 734 to the closed position is also facilitated by the application of pilot pressure through a pilot control line 733 located downstream of the diaphragm supply valve 703.

Next the air vent valve 736 and open water filled valve 738 are opened until the suction hose 409 sinks below the surface of the water. During this time the suction hose 409 fills with liquid coming in through the water fill valve 738, while any air within the suction hose 409 bleeds through the air vent valve 736. During the next step the water fill valve 738 is left open until water comes out of the air vent valve 736, indicating that most or all of the air within the suction hose 409 has been removed. Then the air vent valve 736 and water fill valve 738 are closed. Then the diaphragm pump 702 is started, and the pinch valve solenoid 734 is energized and the solenoid moves to a closed position when the pump terms on, which then opens the pinch valve 728 and allows the suction hose 409 to then begin sucking volumes of liquid from the floating weir.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. A system for consolidating and removing contaminate including paint sludge or oils from a fluid mixture, the system comprising:
    a contaminate tank receiving a supply of the fluid mixture containing contaminate;
    a floating weir floating on the surface of the contaminate tank for mechanically separating and removing contaminate from a surface of the fluid mixture collected in the contaminate tank, the floating weir including:
    a housing with a suction box having two or more hinged doors each having a float member connected to said two or more hinged doors;
    two or more floatation regions of the housing operably connected to said suction box;
    a motor connected to the suction box and having a rotatable shaft extending down into the suction box and an outlet formed on a surface of the suction box;
    one or more chopping blades connected to and rotatable with the shaft for chopping up or agitating the contaminate within the suction box prior to the contaminate entering the outlet;
    a suction hose connected to the outlet of the suction box for providing a vacuum suction for removing contaminate from the suction box;
    a consolidation tank for receiving the contaminate from contaminate tank, wherein said consolidation tank includes a surface scraper for collecting contaminate proximate to the surface of the consolidation tank;
    a contaminate chute operatively associated with the scraper for receiving the contaminate removed by the scraper;
    a pump screen dividing said contaminate tank into a first section where said fluid mixture enters and a second section where a portion of said fluid mixture exits said contaminate tank;
    one or more booth pumps contained in said second section contaminate tank for removing said portion of said fluid mixture;
    an air source connected to an air circuit;
    a pinch valve connected between the suction hose and the floating weir for selectively reducing or stopping flow of liquid from the floating weir into the suction hose; and
    a primer hose connected between the air source and the pinch valve for selectively supplying compressed air to open and close the pinch valve during a priming sequence for the suction hose.

2. The system of claim 1 wherein said floating weir further comprises:
    an air frame connected to the housing of the floating weir;
    a plurality of apertures formed on the air frame;
    an air source connected to the air frame for supplying pressurized air to the air frame, wherein the pressurized air bubbles pass through the plurality of apertures in the air frame causing the surface of the liquid adjacent the two or more hinged doors and inside the suctions box to be turbid and agitate the contaminate prior to being pulled into the one or more chopping blades.

3. The system of claim 2 further comprising one or more clamps connecting the air frame to the outside surface of the housing of the floating weir.

4. The system of claim 2 further comprising:
    wherein the air frame includes a T connection;
    a vertical line coupled to the T connection that extends upward from a bottom side of the housing of the floating weir to a top side of the housing of the floating weir;
    an inlet coupling at an end of the vertical line for connection to the air source connected to the air frame.

5. The system of claim 1 further comprising a contaminate treatment device for receiving contaminate from said contaminate chute.

6. The system of claim 1 further comprising a diaphragm pump or self priming pump connected to the suction hose;
    a water fill valve and air vent valve connected between the suction hose and the diaphragm pump, wherein the water fill valve and air vent valve are opened to allow liquid to fill the suction hose through the water fill valve, while air in the suction hose is vented through the air vent valve prior to operating the diaphragm pump.

7. A system for removing contaminate including consolidated paint sludge or oils from a fluid mixture, the system comprising:
    a contaminate tank receiving a supply of the fluid mixture containing contaminate;
    a pump screen dividing said contaminate tank into a first section where said fluid mixture enters and a second section where a portion of said fluid mixture exits said contaminate tank;
    a stationary weir operably connected to a stationary surface in said first section of the contaminate tank for mechanically separating and removing the contaminate from a surface of the fluid mixture collected in said first section;
    a floating weir free floating on the surface of said second section of the contaminate tank for mechanically separating and removing contaminate from a surface of the fluid mixture collected in said second section, wherein the floating weir includes:
    a housing with a suction box having two or more hinged doors each having a float member connected to said two or more hinged doors;
    two or more floatation regions of the housing operably connected to said suction box;
    a motor connected to the suction box and having a rotatable shaft extending down into the suction box and an outlet formed on a surface of the suction box;
    one or more chopping blades connected to and rotatable with the shaft for chopping up or agitating the contaminate within the suction box prior to the contaminate entering the outlet;
    a suction hose connected to the outlet of the suction box for providing a vacuum suction for removing contaminate from the suction box;
    a consolidation tank for receiving the contaminate collected by said stationary weir and said floating weir, wherein said consolidation tank includes a surface scraper for collecting contaminate proximate to the surface of the consolidation tank;

a contaminate chute operatively associated with the scraper for receiving the contaminate removed by the scraper;

one or more booth pumps contained in said second section of said contaminate tank for removing said portion of said fluid mixture; and an air source connected to an air circuit;

a pinch valve connected between the suction hose and the floating weir for selectively reducing or stopping flow of liquid from the floating weir into the suction hose; and a primer hose connected between the air source and the pinch valve for selectively supplying compressed air to open and close the pinch valve during a priming sequence for the suction hose.

8. The system of claim 7 wherein said floating weir further comprises:

an air frame connected to the housing of the floating weir;

a plurality of apertures formed on the air frame;

an air source connected to the air frame for supplying pressurized air to the air frame, wherein the pressurized air bubbles pass through the plurality of apertures in the air frame causing the surface of the liquid adjacent the two or more hinged doors and inside the suctions box to be turbid and agitate the contaminate prior to being pulled into the one or more chopping blades.

9. The system of claim 8 further comprising one or more clamps connecting the air frame to the outside surface of the housing of the floating weir.

10. The system of claim 8 further comprising:

wherein the air frame includes a T connection;

a vertical line coupled to the T connection that extends upward from a bottom side of the housing of the floating weir to a top side of the housing of the floating weir;

an inlet coupling at an end of the vertical line for connection to the air source connected to the air frame.

11. The system of claim 7 further comprising a contaminate treatment device for receiving contaminate from said contaminate chute.

12. The system of claim 7 further comprising a diaphragm pump or self priming pump connected to the suction hose;

a water fill valve and air vent valve connected between the suction hose and the diaphragm pump, wherein the water fill valve and air vent valve are opened to allow liquid to fill the suction hose through the water fill valve, while air in the suction hose is vented through the air vent valve prior to operating the diaphragm pump.

13. A system for consolidating and removing contaminate including paint sludge from a fluid mixture, the system comprising:

a contaminate tank receiving a supply of fluid mixture containing contaminate;

a floating weir positioned on the surface of the contaminate tank for mechanically separating and removing contaminate from a surface of the fluid mixture collected in the contaminate tank, wherein the floating weir includes:

a housing with a suction box having two or more hinged doors each having a float member connected to said two or more hinged doors;

two or more floatation regions of the housing operably connected to said suction box;

a motor connected to the suction box and having a rotatable shaft extending down into the suction box and an outlet formed on a surface of the suction box;

one or more chopping blades connected to and rotatable with the shaft for chopping up or agitating the contaminate within the suction box prior to the contaminate entering the outlet;

a suction hose connected to the outlet of the suction box for providing a vacuum suction for removing contaminate from the suction box;

a consolidation tank for receiving the contaminate from the contaminate tank, wherein said consolidation tank includes a surface scraper for collecting contaminate proximate to the surface of the consolidation tank;

a micro-aeration inlet connected to the consolidation tank for inputting contaminate from the contaminate tank to the consolidation tank;

an induced air flotation arrangement having a fluid mixture source, an atmospheric air source for supplying atmospheric air and an aeration pump for creating an induced air mixture from the fluid mixture received from the fluid mixture source and the atmospheric air from the atmospheric air source, wherein said induced air mixture is input into the consolidation tank through the micro-aeration inlet;

a contaminate chute arranged for receiving contaminate removed by said surface scraper;

a pump screen dividing said contaminate tank into a first section where said fluid mixture enters and a second section where a portion of said fluid mixture exits said contaminate tank;

one or more booth pumps contained in said second section of said contaminate tank for removing said portion of said fluid mixture; and an air source connected to an air circuit;

a pinch valve connected between the suction hose and the floating weir for selectively reducing or stopping flow of liquid from the floating weir into the suction hose; and a primer hose connected between the air source and the pinch valve for selectively supplying compressed air to open and close the pinch valve during a priming sequence for the suction hose.

14. The system of claim 13 wherein said floating weir further comprises:

an air frame connected to the housing of the floating weir;

a plurality of apertures formed on the air frame;

an air source connected to the air frame for supplying pressurized air to the air frame, wherein the pressurized air bubbles pass through the plurality of apertures in the air frame causing the surface of the liquid adjacent the two or more hinged doors and inside the suctions box to be turbid and agitate the contaminate prior to being pulled into the one or more chopping blades.

15. The system of claim 14 further comprising one or more clamps connecting the air frame to the outside surface of the housing of the floating weir.

16. The system of claim 14 further comprising:

wherein the air frame includes a T connection;

a vertical line coupled to the T connection that extends upward from a bottom side of the housing of the floating weir to a top side of the housing of the floating weir;

an inlet coupling at an end of the vertical line for connection to the air source connected to the air frame.

17. The system of claim 13 further comprising a contaminate treatment device for receiving contaminate from said contaminate chute.

18. The system of claim 13 further comprising
a diaphragm pump or self priming pump connected to the suction hose;
a water fill valve and air vent valve connected between the suction hose and the diaphragm pump, wherein the water fill valve and air vent valve are opened to allow liquid to fill the suction hose through the water fill valve, while air in the suction hose is vented through the air vent valve prior to operating the diaphragm pump.

* * * * *